United States Patent [19]
Lee

[11] Patent Number: 6,098,175
[45] Date of Patent: *Aug. 1, 2000

[54] ENERGY-CONSERVING POWER-SUPPLY SYSTEM

[75] Inventor: Howard Hong-Dough Lee, Bloomfield, Mich.

[73] Assignee: SmartPower Corporation, Bloomfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 09/028,032

[22] Filed: Feb. 24, 1998

[51] Int. Cl.$^7$ .................................................. G06F 1/32
[52] U.S. Cl. .................... 713/320; 713/324; 713/340; 307/80
[58] Field of Search ............. 395/750.01, 750.02, 395/750.03, 750.04, 750.05, 750.06, 750.07, 750.08; 363/15, 34, 37; 307/2, 21, 22, 23, 25, 26, 28, 38, 64–66, 77, 80

[56] References Cited

U.S. PATENT DOCUMENTS

| | | | |
|---|---|---|---|
| 3,766,403 | 10/1973 | Tsutsumi | 307/66 |
| 4,315,162 | 2/1982 | Ferguson | 307/66 |
| 4,673,195 | 6/1987 | Boyd et al. | 280/801.1 |
| 4,860,185 | 8/1989 | Brewer et al. | 363/41 |
| 5,032,971 | 7/1991 | Yamada | 363/65 |
| 5,383,140 | 1/1995 | Namo et al. | 364/708.1 |
| 5,410,713 | 4/1995 | White et al. | 395/750 |
| 5,491,721 | 2/1996 | Cornelius et al. | 375/222 |
| 5,513,361 | 4/1996 | Young | 395/750.03 |
| 5,530,879 | 6/1996 | Crump et al. | 395/750 |
| 5,563,456 | 10/1996 | Berger | 307/66 |
| 5,578,876 | 11/1996 | Crampton | 307/80 |
| 5,579,524 | 11/1996 | Kikinis | 713/324 |
| 5,587,881 | 12/1996 | Wang | 361/695 |
| 5,588,054 | 12/1996 | Shin et al. | 379/413 |
| 5,629,694 | 5/1997 | Simon et al. | 341/22 |
| 5,631,814 | 5/1997 | Zak | 363/37 |
| 5,691,630 | 11/1997 | Chosa | 323/267 |
| 5,751,564 | 5/1998 | Dien | 363/37 |
| 5,781,422 | 7/1998 | Lavin et al. | 363/37 |

Primary Examiner—Glenn A. Auve
Attorney, Agent, or Firm—Hartman & Hartman, P.C.

[57] ABSTRACT

An energy-conserving power-supply system utilizes a keep-alive DC power to consistently power a control circuit so as to render a main power supply readily actuatable for either distributing AC power or supplying regulated DC power. The energy-conserving power-supply system allows any one of modern information-processing or entertainment electronic products to be readily operable manually, remotely, or automatically from a standby state; while, it totally eliminates any unnecessary energy waste because AC power is neither transmitted nor wasted not only within but outside the power-supply system. The latter allows an external line-operated device to be concurrently operable from a no-power state, i.e., without consuming any standby energy at all. Not only can the energy-conserving power-supply system conserve energy usage to the greatest extent, it will also correspondingly extend the life spans of electronic circuitry and electromechanical components.

46 Claims, 6 Drawing Sheets

ENERGY-CONSERVING POWER-SUPPLY SYSTEM

FIELD OF THE INVENTION

The present invention relates to a power-supply system having highest efficiency in energy savings, and more particularly to an energy-conserving power-supply system utilizing a keep-alive power to power a control system for actuating the supply of either main DC power or AC power so as to maximize energy savings.

BACKGROUND OF THE INVENTION

In today's society, use of modem information-processing machines and entertainment electronic products (including computers, fax machines, modems, printers, monitors, scanners, telephone answer machines, wireless telephones, copy machines, VCRs, stereos, microwave machines, etc.) has nearly become a routine practice for everyone. Not only are billion units of such electronic products in service, but more and more new units will be manufactured and sold. As a result, power or energy waste can be accumulated to an alarming amount even if each unit is inefficient in power conserving for just one watt.

Inefficiency in power utilization can be seen in any electronic products that require line-operated power supplies. In the category of information-processing products, for example, a typical fax machine has to consume roughly 10 watts of power in order to maintain its standby state for detecting an incoming call of facsimile information.

Recently, a great deal of effort has been made to conserve power usage in information-processing apparatuses, for example, U.S. Pat. Nos. 5,491,721 and 5,530,879 dealing with modems, and U.S. Pat. No. 5,588,054 dealing with a computer system. The prior arts basically improve power utilization after AC power is converted to regulated DC power through utilizing a power management processor to place an information-processing device selectively between a normal state and a standby state. Improvement of a modem alone has no ability to enable its associated power-supply unit to operate more efficiently. On the other hand, the power-supply unit of U.S. Pat. No. 5,530,879 remains inefficient and has to consume about 5 watts for maintaining a 486-based computer in a suspended state. The other disadvantage of the power-supply unit is that it can at best place its line-operated monitor in a standby state, which again incurs energy waste even if the monitor is redundantly equipped with energy-conserving hardware.

Further, the applicant believes that a higher amount of energy waste is inevitable for a 586-based, Pentium®-based, or other high-performance computer system because the cooling fan attached to a newer, power-hungry microprocessor and the cooling fan enclosed in its power-supply unit will always keep rotating and will thus incur additional energy waste, even if a power-supply unit is designed in accordance with U.S. Pat. Nos. 5,530,879, 5,491,721 and 5,588,054.

On the other hand, U.S. Pat. No. 5,410,713 describes a computer power system having a keep alive power supply, a switchable power supply, and a power management processor, wherein both the keep alive power supply and the switchable power supply are obtained from converting an external AC-power source to regulated DC power. As detailed in its claims, the prior art specifically directs that the output of the switchable power supply be coupled to supply power to a computer. Consequently, similar to the other prior arts mentioned hereinabove, it emphasizes the energy conservation of the host computer rather the computer power system itself because it does not recognize the fact that consistent rotating of the cooling fan of the computer power system also incurs substantial energy waste even when its host computer enters a standby state.

Also well known in the conventional power-conservation practice is a method of requesting a business machine to enter a standby state through software. For instance, an NEC SuperScript 660 laser printer can be automatically powered down from 400 watts to 15 watts through its software program. Many other information-processing machines need to continuously maintain such a standby state in order to render a computer system or a fax machine capable of receiving facsimile information through a telephone line. Even though it is only 15 watts per standby machine, energy waste associated with the standby state can accumulate to an unbelievable amount in view of the mass market of electronic products placed in service.

In the category of entertainment electronics, a VCR needs to maintain its standby state in order to run its timer and to retain and execute a program preset by a user. Likewise, modern television sets, Hi-Fi stereos, microwave machines, telephone answer machines, wireless telephone machines, and alarm radios all need to continuously maintain their respective standby states in order to be readily operable or to be responsive to a remote control signal. For achieving the convenience of these features, each of the entertainment electronic products has being equipped with a power-supply unit capable of switching between two states manually or automatically. However, the convenience is obtained at the cost of wasting AC power. In addition to energy waste, the standby state of the conventional practice causes unpleasant noise (generated from a cooling fan, for instance) and shortens the life spans of electronic products.

The power system of conventional computer provides no immediate solution to the energy waste associated with the two-state power system of the entertainment electronics. Nor is the two-state power system of the entertainment electronics capable of resolving the energy waste of information-processing devices.

It becomes evident that the conventional line-operated power system utilized to power the modern information-processing and entertainment electronic products is inefficient in power conservation; an enormous amount of energy has been and will be inevitably wasted if the power systems of these products are continuously manufactured in accordance with the conventional practice. Consequently, there is an urgent need to design a novel power-supply system for efficiently conserving power and energy usage in the mass market of electronic products. This can lead to an enormous amount of energy savings even if each of the power-supply systems saves only one single watt.

OBJECTS OF THE INVENTION

Accordingly, a first primary object of the present invention is to provide an energy-conserving power-supply system for use in a computer system, wherein the energy-conserving power-supply system utilizes a keep-alive power supply for supplying low-power regulated DC to consistently power a control circuit so as to render an actuatable power supply readily actuatable for supplying main regulated DC power to various components including at least a cooling fan of the energy-conserving power-supply system itself. This allows the cooling fan to be actuated only when the actuatable power supply generates the main regulated DC power in order for the computer system to enter its normal state. In contrast, the fan enclosed in a conventional computer power supply unit always keeps rotating once the host computer is turned on.

A second primary object of the present invention is to provide an energy-conserving power-supply system utilizing a keep-alive power supply for supplying regulated DC power to consistently power a control circuit so as to control the distribution of AC power of an actuatable power supply at least to an AC outlet disposed on an external surface of a housing. This allows the AC outlet to selectively output AC power to an external line-operated device such as a monitor or printer in accordance with a signal issued by its host electronic device or host computer. In contrast, AC power of a convention power-supply unit is not signal-actuatable; thus, each of line-operated devices placed in a standby state has to waste at least 10–20 watts of energy.

A third primary object of the present invention is to provide an energy-conserving power-supply system utilizing a power storage (such as a battery, dynamo, solar cell, or fuel cell) for supplying keep-alive DC power to consistently power a control circuit so as to control the distribution of AC power of an actuatable power supply. This allows the actuatable power supply to distribute, only when needed, AC power internally for generating regulated DC power and externally for actuating an external line-operated device such as a monitor or printer in accordance with a signal issued from its host electronic device or host computer. It eliminates any energy waste not only within but outside the energy-conserving power-supply system. Preferably, the power generator is a battery arranged in such a manner as to supply backup DC power when external AC power suddenly becomes absent.

A forth primary object of the present invention is to provide an energy-conserving power-supply system utilizing a power storage (such as a battery, dynamo, solar cell, or fuel cell) for supplying keep-alive DC power to consistently power a control circuit so as to control the supply of regulated DC power (serving as main DC power) of an actuatable power supply (through converting AC power from an external AC-power source). The power storage keeps any modern electronic products such as computers, fax machines, modems, printers, monitors, scanners, telephone answer machines, wireless telephones, copy machines, VCRs, stereos, microwaves, etc. alive and operable remotely, manually or automatically from their respective standby states; while, it totally eliminates any other energy waste because AC power is neither transmitted to the actuatable power supply for converting into regulated DC power thus nor wasted in the energy-conserving power-supply system itself. Accordingly, for instance, a host computer in a standby state will neither consume AC power nor incur any other energy waste yet can readily detect an incoming call of facsimile information. Preferably, the power storage is a rechargeable battery arranged in a manner chargeable when the actuatable power supply is actuated to supply the regulated DC power. The rechargeable battery can be arranged to supply DC power to the actuatable power serving as backup DC power when the external AC source suddenly ceases to supply AC power so that its host computer or device can still accomplish an existing operation and thus to safely save data files to an associated hard-disk drive, for instance. The energy-conserving power-supply system can also comprise a separately actuatable AC power supply to selectively output AC power, so as to totally eliminate any energy waste incurred conventionally by an external line-operated device connected to the power-supply system, when the host computer or electronic device enters its standby state.

SUMMARY OF THE INVENTION

The present invention provides an energy-conserving power-supply system for use in a computer system, wherein the energy-conserving power-supply system utilizes a first power supply to supply keep-alive DC power to consistently power a control circuit so as to render a second power supply actuatable for generating and distributing main DC power to various internal and external components including a cooling fan for dissipating the heat generated by the energy-conserving power-supply system itself. This eliminates energy waste incurred by the cooling fan that is in conventional practice arranged to keep rotating continuously once a conventional power-supply unit is turned on.

The present invention provides an energy-conserving power-supply system utilizing a first power supply for supplying keep-alive DC power to power a control circuit so as to render a signal-actuatable switch readily actuatable for activating a second power supply to distribute AC power at least to an AC outlet disposed on an external surface of a housing. The energy-conserving power-supply system renders an external line-operated device such as a monitor or printer readily operable from a no-power state without consuming any AC power. When further comprising a third power supply actuatable for converting AC power to second regulated DC power serving as main DC power, the energy-conserving power-supply system can efficiently conserve energy usage in its host computer or host device. For achieving the features mentioned above, the control circuit is comprised of means for interfacing or communicating with associated internal and/or external devices and microprocessor means for determining and controlling the activity of the signal-actuatable switch accordingly.

The present invention provides an energy-conserving power-supply system utilizing a first power supply having an power storage (such as a battery, dynamo, solar cell, or fuel cell) for supplying keep-alive DC power to consistently power a control circuit so as to render a signal-actuatable switch readily actuatable for activating a second power supply to distribute AC power received from an external AC-power source. This allows the AC power to be controllably distributed not only within but outside the energy-conserving power-supply system, so as to generate regulated DC power and to supply the AC power to an external line-operated device only when needed. Thus, it totally eliminates any energy waste seen in a conventional electronic product placed in its standby state. Preferably, the power storage is a battery arranged in such a manner as to supply backup DC power to the third power supply, when the external AC-power source suddenly ceases to supply AC power, so that its host computer or device can continue to complete an existing operation and thus to safely save data flies to an associated hard-disk drive. Furthermore, the battery is rechargeable and arranged in a manner chargeable when the signal-actuatable switch actuates the third power supply to generate regulated DC power. For achieving the features mentioned above, the control circuit comprises means for interfacing or communicating with associated internal and/or external devices and microprocessor means for determining and controlling the activity of the signal-actuatable switch accordingly. The microprocessor means can be instructed to actuate the third power supply to supply regulated DC power for charging the battery when detecting the battery reaching a predetermined low level of DC power.

The present invention provides an energy-conserving power-supply system utilizing a first power supply having an power storage (such as a battery, dynamo, solar cell, or fuel cell) for supplying keep-alive DC power to consistently power a control circuit so as to render a signal-actuatable switch readily actuatable for activating a second power supply to supply regulated DC power serving as main DC power. Preferably, the second power supply and the signal-actuatable switch are arranged in such a manner as to allow the signal-actuatable switch to selectively supply AC power from an external AC source to the second power supply for converting into the regulated DC power, so that AC power is neither transmitted nor wasted in the energy-conserving power-supply system when a host device enters its standby state. The energy-conserving power-supply system further comprises a third power supply the actuatable for selectively supplying AC power received from the external AC-power source to various components or associated devices, so as to allow an external line-operated device to receive AC power only when needed. An AC-power outlet of the third power supply is disposed on an external surface of the housing of its host computer or host device, so that it is readily accessible by an external line-operated device while incurs no standby energy waste outside the energy-conserving power-supply system. Preferably, the power storage is a battery arranged in such a manner as to supply DC power to the second power supply as backup DC power, when the external AC-power source suddenly ceases to supply AC power, so that its host computer or device can still accomplish an existing operation and thus to safely save data files to an associated hard-disk drive. The battery can be either a non-rechargeable battery, rechargeable battery, and their combinations. A rechargeable battery is preferably arranged in a manner chargeable, when the signal-actuatable switch actuates the second power supply to supply the regulated DC power. For achieving the features mentioned above, the control circuit is comprised of means for interfacing or communicating with associated internal and/or external devices and microprocessor means for determining and controlling the activity of the signal-actuatable switch accordingly. When integrated with a host electronic product, the microprocessor means of the energy-conserving power-supply system can be replaced by its host microprocessor; and, the power storage or battery of the present embodiment can replace the battery conventionally installed on a computer motherboard. Further afforded can be a manual-operable button for manually requesting the microprocessor means to actuate the energy-conserving power-supply system to enter its standby state or to resume its normal state, so as to eliminate any energy waste manually.

DETAILED DESCRIPTION OF THE PREFERRED EMBODIMENT

Figure 1:
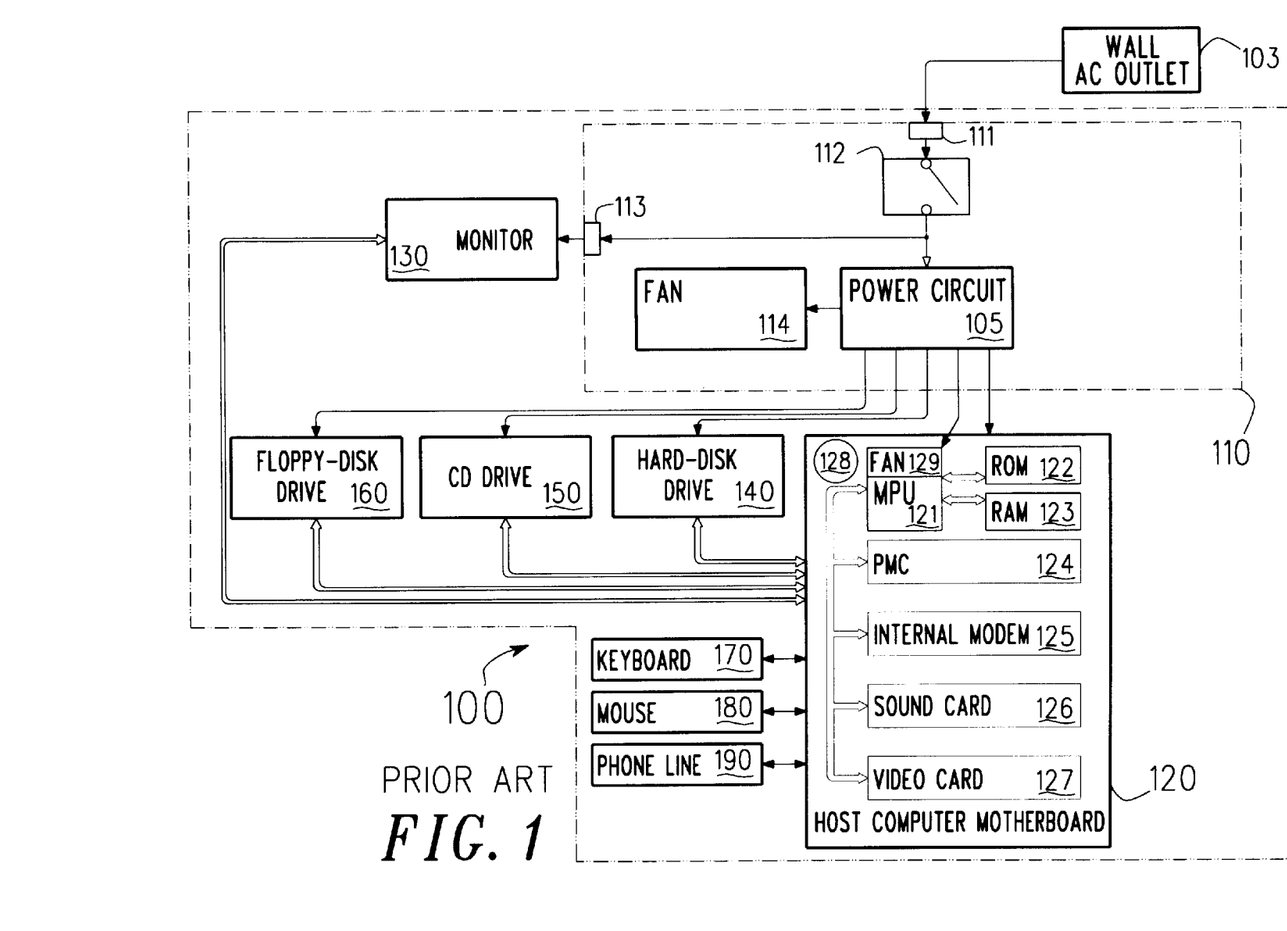
FIG. 1 is a block diagram of a conventional power-supply unit used in a computer system.

In conventional practice as shown in FIG. 1, a line-operated power-supply unit 110 utilized in a computer system 100 basically contains an AC-power receptacle 111, a manual power switch 112 for manually inputting AC power (either 115 or 220 VAC) from a wall AC outlet (or external AC source) 103, an AC outlet 113 for outputting 115 VAC to power a monitor 130 at the same time, a cooling fan 114, and a power circuit 105. Power circuit 105 has several DC-power outputs (including ±12 VDC, ±5 VDC, powergood, and ground lines) for supplying regulated DC power to a host computer motherboard 120, a hard-disk drive 140, a CD drive 150, and a floppy-disk drive 160. In circuit communication with host computer motherboard 120, each of the last three drives receives +12 VDC and +5 VDC directly from power circuit 105. Host computer motherboard 120 is mounted with a microprocessor (MPU) 121, read only memory (ROM) 122, random-access memory (RAM) 123, a power management circuit (PMC) 124, an internal modem 125, a sound card 126, a video card 127, and a battery 128. A fan 129 mounted on MPU 121 always keeps rotating in order to remove heat dissipated from MPU 121. Host computer motherboard 120 is also in circuit communication with a keyboard 170, a mouse 180, and a phone line 190. PMC 124 renders computer system 100 operable in several states including an off, standby, or suspended state for conserving power.

In accordance with the conventional practice, substantial energy waste is inevitable even if computer system 100 is placed in its standby or suspended state. First, line-operated power-supply unit 110 has to transform voltage, to rectify AC voltage to DC voltage, and to regulate output, which always incur power loss due to associated heat dissipation, eddy current loss and hysteresis effect. Second, the cooling fan for dissipating heat generated by the line-operated power-supply unit is designed to rotate continuously, once the line-operated power-supply unit is turn on, thus incurring energy waste even in the standby or off state. Third, neither AC power input through manual power switch 112 to the conventional power-supply unit nor AC power output to an external line-operated device (for example, monitor 130) is signal actuatable; thus, it will incur energy waste not only within but outside the conventional power-supply unit, as soon as power is turned on.

Accordingly, a first primary preferred embodiment of the present invention is to provide an energy-conserving power-supply system for use in a computer system, having a cooling fan capable of being actuated for dissipating heat only when the computer enters its normal state. This allows the energy-conserving power-supply system itself to conserve energy usage.

Further, a second primary preferred embodiment of the present invention is to provide an energy-conserving power-supply system utilizing a keep-alive regulated DC-power supply to control the distribution of AC power, so as to render, in addition to its host electronic device, an external line-operated device readily operable from a no-power state when needed. There is essentially no energy waste associated with the external line-operated device placed in the no-power state of the present invention.

Figure 2:
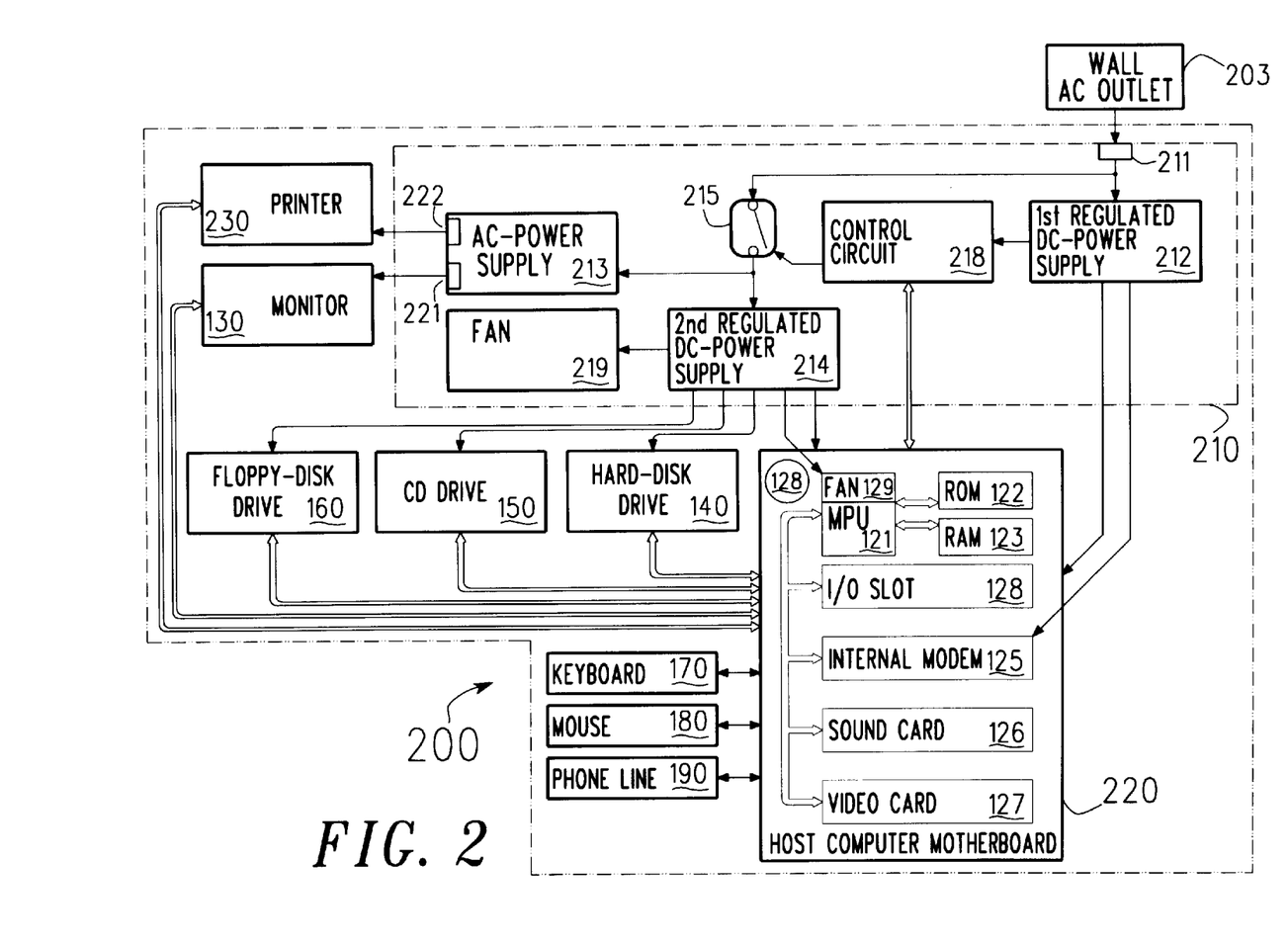
FIG. 2 is a block diagram of an energy-conserving power-supply system having power supplies actuatable for supplying regulated DC power and for distributing AC power in accordance with first and second primary preferred embodiments of the present invention.

Referring now to FIG. 2, there is illustrated a block diagram of an energy-conserving power-supply system 210 in accordance with the first and the second primary preferred embodiments of the present invention. Energy-conserving power-supply system 210 is used in conjunction with a computer system 200 having components identical to those in computer system 100 of FIG. 1, so as to show the distinct features of the present embodiments.

Comprised in energy-conserving power-supply system 210 are an AC-power receptacle 211 for receiving AC power from a wall AC outlet 203 (i.e., an external AC source), a first regulated DC-power supply 212 for supplying keep-alive power, an AC-power supply 213 for supplying and distributing AC power, a second regulated DC-power supply 214 for supplying main DC power, a signal-actuatable switch (or relay) 215, a power control circuit 218, and a cooling fan 219. AC power (either 115 or 220 VAC) received from wall AC outlet 203 is coupled to first regulated DC-power supply 212 and signal-actuatable switch 215 in parallel. As long as AC power is supplied from wall AC outlet 203, first regulated DC-power supply 212 always generates low-amperage DC power (e.g., 500 mA or less) to keep an internal modem 125, a host computer motherboard 220, and power control circuit 218 alive. AC power is further controllably distributed to second regulated DC-power supply 214 and AC-power supply 213 which has two AC-power outlets 221 and 222, disposed on an external surface of a housing (not shown) of computer system 200, for detachably supplying the AC power to two external line-operated devices (such as monitor 130 and printer 230 respectively).

Power control circuit 218 has means for interfacing or communicating signals between associated internal and/or external devices and a microprocessor, so as to communicate with host computer motherboard 220 and to receive a signal issued therefrom, and to determine the activity of signal-actuatable switch 215 in accordance with the signal. Preferably, first regulated DC-power supply 212 supplies low-amperage DC power locally to part of RAM 123 mounted on host computer motherboard 220 so as to render computer system 200 capable of retaining essential information without consuming unnecessary power, and locally to internal modem 125 so as to allow internal modem 125 to detect a ring signal without wasting unnecessary power.

Only when signal-actuatable switch 215 is actuated, AC power is supplied to AC-power supply 213 for distributing to AC-power outlets 221 and 222, and to second regulated DC-power supply 214 for generating main DC power or regulated high-amperage DC-power supplies (typically, from 1 to 24 A). Second regulated DC-power supply 214 has plural DC-power outlets for outputting the main DC power to host computer motherboard 220, fans 129 and 219, hard-disk drive 140, CD drive 150, and floppy-disk drive 160, for computer system 200 to operate in its normal state. Signal-actuatable switch 215 further controls the supplying of the AC power to a printer 230 and a monitor 130. Computer system 200 is now ready to receive facsimile information through internal modem 125 from phone line 190 and to print out the facsimile information through printer 230. Upon completion of printing the facsimile information received, power control circuit 218 detects a completion signal from MPU 121 and thus actuates signal-actuatable switch 215 to turn off all AC-power supplies to AC-power supply 213 (for distributing to monitor 130 and printer 230) and to second regulated DC-power supply 214. In accordance with the second primary preferred embodiment, computer system 200 can now replace an ordinary fax machine and consumes little power because fans 129 and 219, AC-power supply 213 and second regulated DC-power supply 214 can be turned off by an electric signal, thus incurring no unnecessary energy waste at all.

Figure 3:
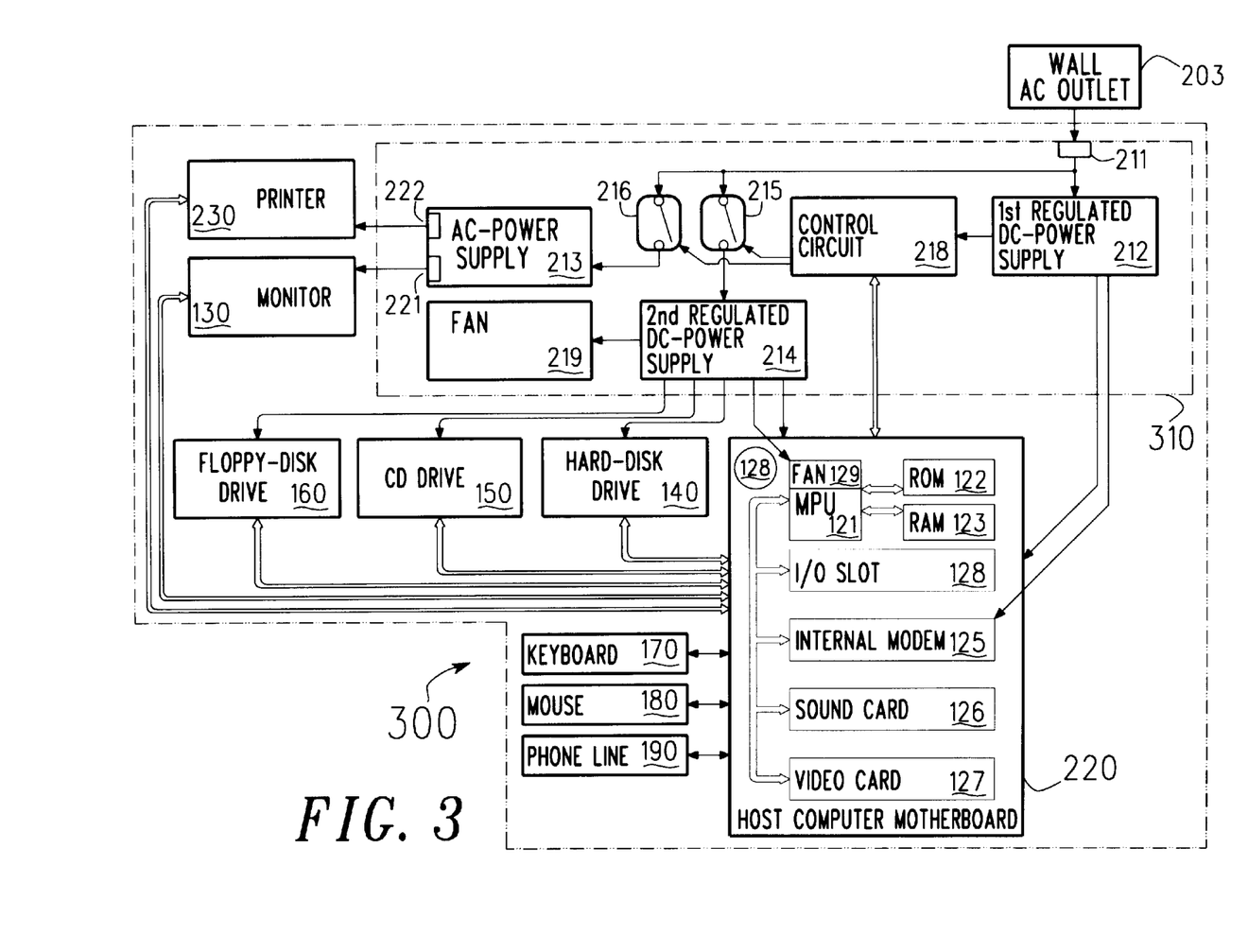
FIG. 3 is a block diagram of an energy-conserving power-supply system having an actuatable AC-power supply and actuatable regulated DC-power supply arranged in accordance with the second primary preferred embodiment of the present invention.

FIG. 3 illustrates an energy-conserving power-supply system 310, which is an alternative of the first and the second primary preferred embodiments, having components nearly identical to those of energy-conserving power-supply system 210 shown in FIG. 2, except that the former has an additional signal-actuatable switch 216 that independently controls the supply of the AC power to AC-power supply 213. This allows the activities of external line-operated devices (including printer 230 and monitor 130) to be controlled separately from host devices (including host computer motherboard 220, hard-disk drive 140, CD drive 150, floppy-disk drive 160, keyboard 170, and mouse 180).

It is understandable that, with some modification, energy-conserving power-supply systems 210 and 310 are also applicable to other information-processing apparatuses requiring concurrent operations of several line-operated devices.

As well known in the art, the generation of regulated DC power from AC power requires to transform voltage, to rectify AC voltage to DC voltage, and to regulate output, which always incur power loss as a result of heat dissipation, eddy-current loss, effect of hysteresis, etc. Thus, a most preferred energy-conserving power-supply system of the present invention is to utilize DC power of a battery as a keep-alive power supply, rather than to rely on converting AC power from an external AC-power source to regulated DC power. Accordingly, a block diagram of an energy-conserving power-supply system of this type is detailed in FIG. 4, in accordance with a third primary preferred embodiment of the present invention.

Figure 4:
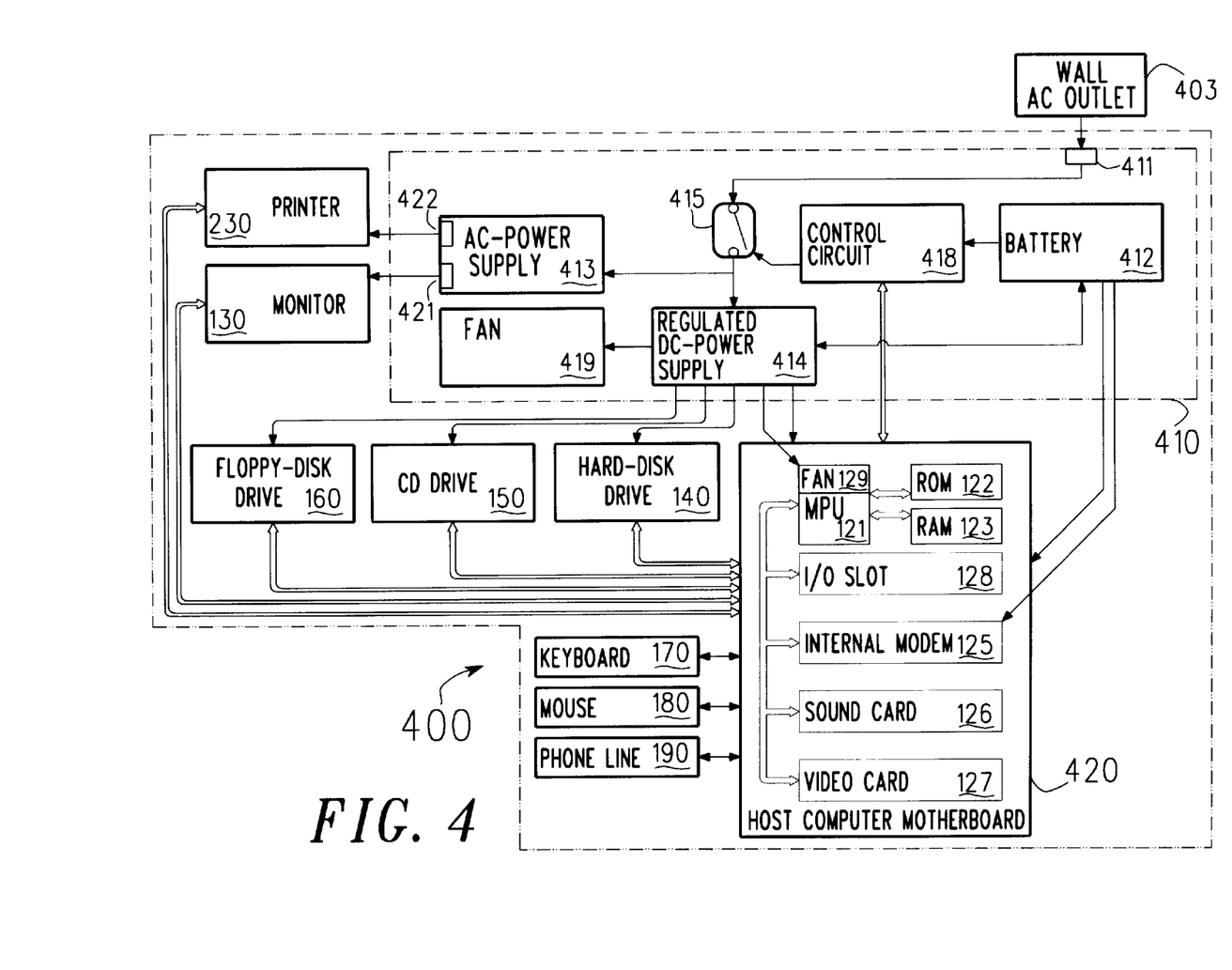
FIG. 4 is a block diagram of an energy-conserving power-supply system having a battery for supplying keep-alive DC power to selectively actuate an actuatable power supply to distribute AC power, in accordance with a third primary preferred embodiment of the present invention.

For exemplary illustration, the energy-conserving power-supply system 410 shown in FIG. 4 is also used in conjunction with a computer system 400 having components nearly identical to those seen in computer system 200 of FIG. 2, except that the latter requires battery 128 (shown in FIG. 2). The battery installed on a conventional computer motherboard has its sole function: to supply DC power to a CMOS clock; thus, it has no other interactive functions or features as the battery of the present embodiment. Specifically, a battery 412 shown in FIG. 4 of the present embodiment provides keep-alive DC power not only to a control circuit 418 but to a computer motherboard 420 for maintaining CMOS clock running, and to internal modem 125 for detecting a ring signal, so that it renders computer system 400 readily operable from a standby state, consuming no AC power and other unnecessary energy at all. Thus, the battery 128 conventionally installed on a computer motherboard 120 of FIG. 1 is replaced by the battery 412 of the present embodiment. When detecting a signal (either from internal modem 125, keyboard 170, or mouse 180), control circuit 418 actuates a signal-actuatable switch 415 to supply AC power received by a receptacle 411 from a wall AC outlet 403 to a regulated DC-power supply 414 for generating and distributing regulated DC power to a fan 419, hard-disk drive 140, CD drive 150, floppy-disk drive 160, and computer motherboard 420. At the same time, signal-actuatable switch 415 further supplies the AC power to an AC-power supply 413 for distributing through AC outlets 421 and 422, disposed on an external surface of a housing (not shown), respectively to monitor 130 and printer 230.

Figure 5:
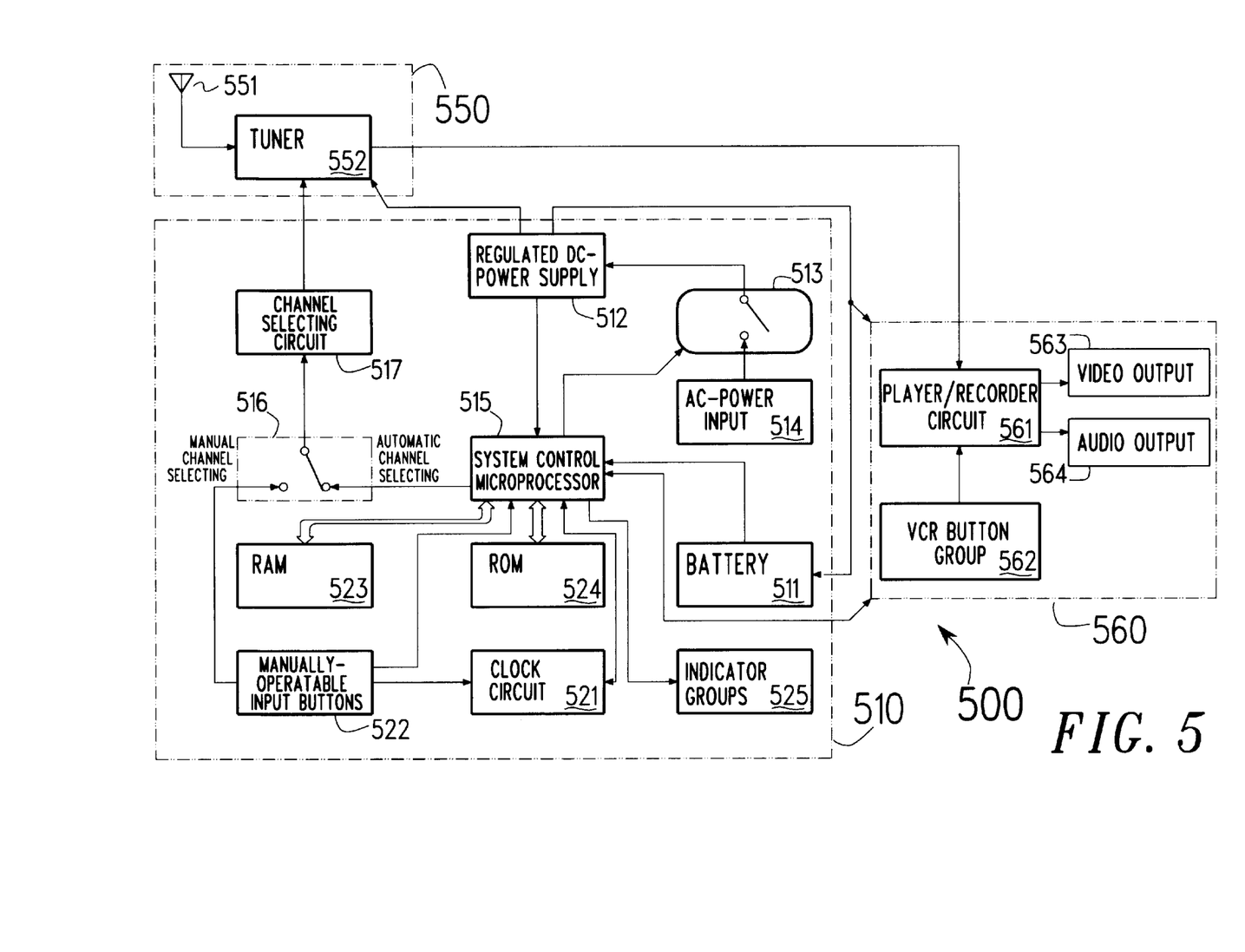
FIG. 5 is a block diagram of an energy-conserving power-supply system having a battery for supplying keep-alive power to selectively actuate an actuatable power supply to supply main DC power to a VCR, in accordance with a forth primary preferred embodiment of the present invention.

Referring now to FIG. 5, an energy-conserving power-supply system in accordance with a forth primary preferred embodiment of the present invention is employed to power a VCR 500. VCR 500 basically comprises a system unit 510, a receiving unit 550, and a VCR player/recorder unit 560. The energy-conserving power-supply system is integrated in system unit 510, which includes a rechargeable battery 511, a regulated DC-power supply 512, a signal-actuatable switch 513, and a system control microprocessor 515. Rechargeable battery 511 provides low-power DC serving as keep-alive power to system control microprocessor 515 so as to allow an indicator groups 525 partially visible for displaying necessary information, to render a clock circuit 521 operable, and to detect a coincidence signal between a current time and program starting-time or recording starting-time data previously stored through manually-operable input buttons 522 in RAM 523. System control microprocessor 515 is afforded with ROM 524 containing basic instructions needed for instructing its operation.

System control unit 510 further comprises a channel-mode selecting switch 516 that allows VCR 500 to operate either in a manual channel selecting mode or in an automatic channel selecting mode. The automatic channel selecting mode is in effect, only when system control microprocessor 515 detects a coincidence signal between a current time and program starting-time data. The manual channel selecting mode of channel-mode selecting switch 516 allows the delivery of a signal actuated by a button selected from manually-operable input means 522 directly to channel selecting circuit 517 for altering channel frequency. In either mode, channel selecting circuit 517 generates and delivers a channel selecting signal corresponding to the manually-selected channel frequency or to the program channel-frequency data by means of a tuning voltage to tuner 552, and controls it.

Thus, system control microprocessor 515 consistently powered by rechargeable battery 511 is capable of controlling the activity of signal-actuatable switch 513, so as to allow AC power to be selectively supplied from AC-power input 514 to regulated DC-power supply 512 for generating main DC power to system control microprocessor 515, to rechargeable battery 511, to receiving unit 550, and to VCR player/recorder unit 560. In summary, VCR 500 does not rely on consuming any AC power for maintaining its readiness or standby state, thus totally eliminating any power loss incurred by heat dissipation, eddy-current loss, and effect of hysteresis, conventionally associated with the line-operated power supply.

The energy-conserving power-supply system shown in FIG. 5 can be further modified, for instance, (1) to have a signal-actuatable AC-power supply for selectively supplying AC power to the outside of its host electronic device or the energy-conserving power-supply system, so as to render an external line-operated device concurrently operable from a no-power state, i.e., without incurring any standby energy waste at all, (2) to have a battery preferably arranged in a manner capable of providing backup DC power, when the external AC-power source ceases to supply AC power, and (3) to have regulated DC-power outlets externally accessible for detachably supplying DC power to an external DC-operated device. These derived features will extend high-efficiency power conservation to printers, monitors, copy machines, scanners, and other information-processing machines.

Figure 6:
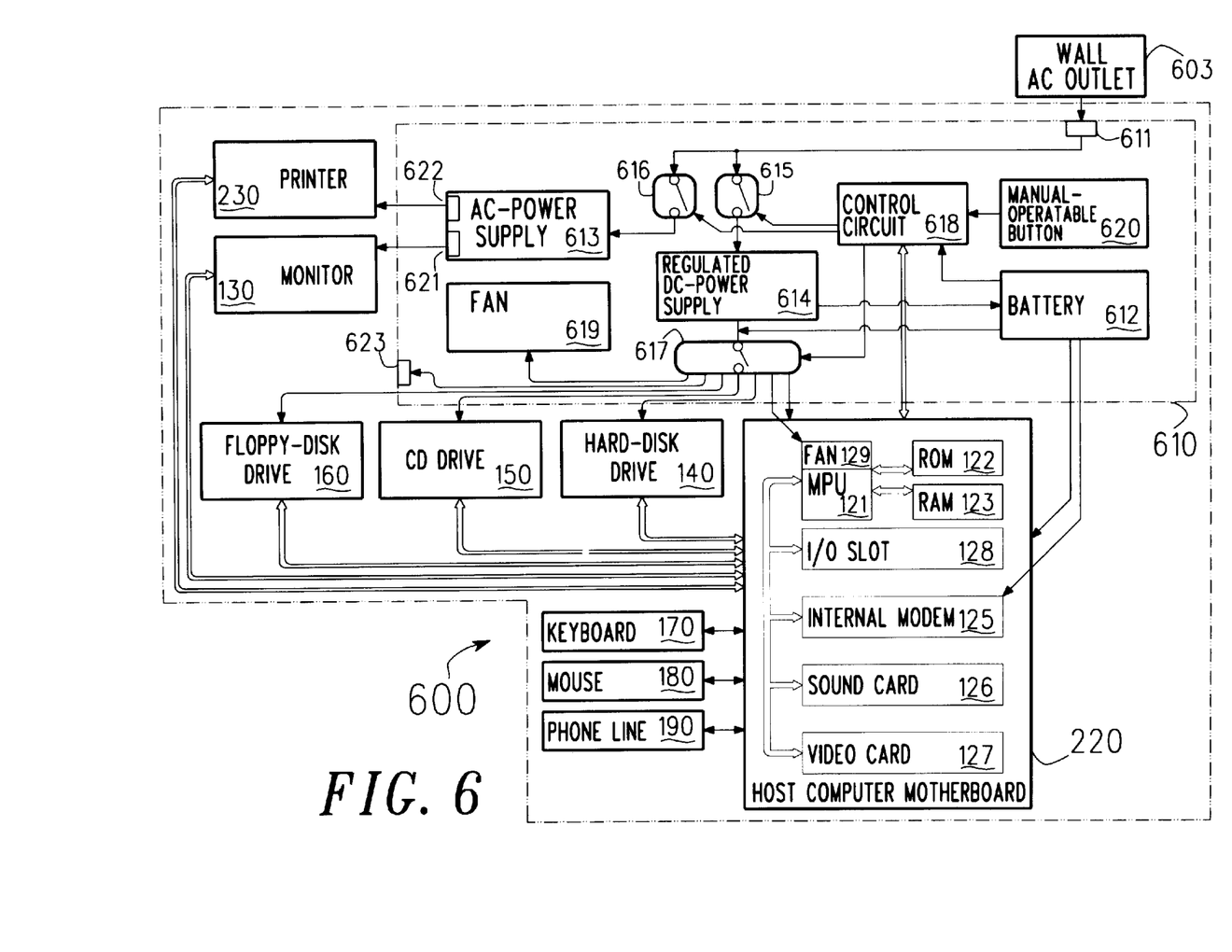
FIG. 6 is a block diagram of an energy-conserving power-supply system, in accordance with the third and the forth primary preferred embodiments of the present invention.

Accordingly, detailed in FIG. 6 is a block diagram of an energy-conserving power-supply system 610 used in conjunction with a computer system 600. Energy-conserving power-supply system 610 comprises (1) a receptacle 611 for receiving AC power from a wall AC outlet 603; (2) a first signal-actuatable switch 615 for selectively supply AC power from receptacle 611 to a regulated DC-power supply 614; (3) a second signal-actuatable switch 616 for supplying AC power to an AC-power supply 613 for redistributing to AC outlets 621 and 622; (4) a third signal-actuatable switch 617 for selectively distributing regulated DC power generated by regulated DC-power supply 614 to fans 619 and 129, hard-disk drive 140, CD drive 150, floppy-disk drive 160, host computer motherboard 220, and a DC outlet 623; and (5) a battery 612 rechargeable for supplying keep-alive DC power. First and third signal-actuatable switches 615 and 617 together allow battery 612 to be independently recharged without actuating any other drives and fans, when control circuit 618 detects the DC power of battery 612 reaching a predetermined low level. Battery 612 is arranged to supply DC power to signal-actuatable switch 617 for distribution, when the external AC-power source suddenly ceases to supply AC power, so that its host computer and/or drives can accomplish an existing operation and thus to safely save data files to an associated hard-disk drive, for instance, and to allow read/write heads of hard-disk drive 140 to position at a predetermined location for preventing damaging or crushing the surfaces of disk media. DC outlet 623 disposed on an external surface of a housing (not shown), allows DC power to be supplied to an external DC-operated device, such as speakers, or other internal-type removable drives. A manual-operable button 620 is further afforded for manually requesting control circuit 618 to issue a control signal to selectively close or open signal-actuatable switches 615–617 so as to activate regulated DC-power supply 614 for supplying regulated DC power in order to enter a normal state or to deactivate regulated DC-power supply 614 for not supplying regulated DC power in order to enter a standby state, respectively.

The energy-conserving power-supply systems shown in FIGS. 5 and 6 are also extremely applicable to power conservation of wide varieties of line-operated electronics such as fax machines, external modems, TVs, telephone answer machines, stereos, alarm clocks, microwaves, etc. In summary, the third and the forth primary preferred embodiments allow line-operated electronic devices to stay in their respective standby states without consuming and wasting any AC power at all, yet renders (1) a fax machine or external modem ready for receiving facsimile information through a telephone line, (2) a TV readily responsive to a remote-control signal, (3) an answer machine readily operable for answering and recording, (4) a stereo capable of retaining preselected channel information and sensing a remote signal, (5) an alarm clock capable of outputting sound in accordance with a preset schedule, and (6) a microwave having a timer operable. As no AC power is transmitted and consumed, electronic circuitry and electro-mechanical components (used in information-storage drives such as hard-disk, CD, and floppy-disk drives) are not actuated at all during the standby state. Consequently, in addition to energy savings, not only their life spans are extended but unpleasant noise is mostly eliminated.

Although these preferred embodiments have been described hereinbefore as applied to a computer system and a VCR, the present invention is applicable to any other modern information-processing or entertainment electronic products to be operable manually, remotely, or automatically. In addition, while a battery is used to supply keep-alive DC power, other power storage such as dynamos, solar cells, or fuel cells with proper mechanisms can be utilized to supply necessary keep-alive power described in the present invention. Thus, it is clearly understood that such embodiments are provided by way of illustration and example only and are not to be taken by way of limitation as numerous variations, changes, modification, and substitutions will occur to those skilled in the art without departing from the invention herein. Accordingly, it is intended that the invention be limited only by the spirit and scope of the appended claims.

What is claimed is:

1. An energy-conserving power-supply system comprising:
    (a) a housing;
    (b) means for inputting AC power from an external AC-power source;
    (c) a first power supply coupled to said means for inputting for generating regulated DC power;
    (d) a second power supply coupled to said means for inputting, including AC outlet means for distributing said AC power thereto, wherein at least one of said AC outlet means is disposed on an external surface of said housing;
    (e) switching means, for selectively activating said second power supply to distribute said AC power; and
    (f) control means continuously powered by said first power supply, for controlling an activity of said switching means.

2. The energy-conserving power-supply system of claim 1 further comprising a third power supply coupled to one of said AC outlet means, for generating second regulated DC power.

3. The energy-conserving power-supply system of claim 1 further comprising a third power supply having means for activating said third power supply to receive AC power from said means for inputting.

4. The energy-conserving power-supply system of claim 1 wherein said control means comprises means for interfacing with an associated device and microprocessor means for determining and controlling the activity of said switching means accordingly.

5. The energy-conserving power-supply system of claim 1 further comprising a cooling means arranged to be selectively powered by said third power supply.

6. An energy-conserving power-supply system comprising:
    (a) a first power supply having power storage means for supplying DC power;
    (b) means for inputting AC power from an external AC power source;
    (c) a second power supply coupled to said means for inputting, said second power supply including means for distributing said AC power to AC outlet means;
    (d) switching means, for selectively activating said second power supply to distribute said AC power received by said means for inputting; and
    (e) control means continuously powered by said first power supply, for controlling an activity of said switching means.

7. The energy-conserving power-supply system of claim 6, wherein said power storage means for supplying DC power is selected from the group consisting of at least one non-rechargeable battery cell, at least one rechargeable battery cell, at least one dynamo, at least one solar cell, at least one fuel cell, and their combinations.

8. The energy-conserving power-supply system of claim 6 further comprising a third power supply having means arranged in such a manner as to receive said AC power from said second power supply for generating regulated DC power.

9. The energy-conserving power-supply system of claim 8, wherein said third power supply is further arranged in such a manner as to receive DC power from said first power supply, when said external AC-power source suddenly ceases to supply AC power to said second power supply.

10. The energy-conserving power-supply system of claim 6 further comprising a third power supply having means for generating regulated DC power and second switch means for selectively activating said third power supply to receive received AC power from said means for inputting so as to generate said regulated DC power.

11. The energy-conserving power-supply system of claim 6 further comprising a housing and said second power supply further comprising at least one AC outlet means disposed on an external surface of said housing for distributing AC power thereto.

12. The energy-conserving power-supply system of claim 6, wherein said control means comprises means for interfacing with an associated device and microprocessor means for determining and controlling the activity of said switching means accordingly.

13. An energy-conserving power-supply system comprising:
    (a) a first power supply including power storage means for supplying DC power;
    (b) means for inputting AC power from an external AC power source;
    (c) a second power supply coupled to said means for inputting, said second power supply including means for converting said AC power received from said means for inputting to regulated DC power;
    (d) switching means, for selectively activating said second power supply to supply said regulated DC power, and;
    (e) control means continuously powered by said first power supply, for controlling an activity of said switching means.

14. The energy-conserving power-supply system of claim 13, wherein said power storage means for supplying DC power is selected from the group consisting of at least one non-rechargeable battery cell, at least one rechargeable battery cell, at least one dynamo, at least one solar cell, at least one fuel cell, and their combinations.

15. The energy-conserving power-supply system of claim 13, wherein said second power supply and said switching means are arranged in such a manner as to render said switching means actuatable for selectively supplying AC power from said means for inputting to said second power supply.

16. The energy-conserving power-supply system of claim 13, wherein said second power supply and said switching means are arranged in such a manner as to render said switching means actuatable for selectively distributing said regulated DC power generated by said second power supply.

17. The energy-conserving power-supply system of claim 13, wherein said first power supply and said second power supply are arranged in such a manner as to allow said first power supply to supply DC power to second power supply for distribution, when said external AC power source suddenly ceases to supply AC power.

18. The energy-conserving power-supply system of claim 13, wherein said power storage means for supplying DC power comprises a rechargeable battery arranged in a manner chargeable when said switching means activates said second power supply to supply said regulated DC power.

19. The energy-conserving power-supply system of claim 18, wherein said control means comprises microprocessor means for determining when said rechargeable battery reaches a predetermined low level of DC power, so as to activate said second power supply to supply said regulated DC power to said rechargeable battery.

20. The energy-conserving power-supply system of claim 13 further comprising a housing and said second power supply having at least one DC outlet means disposed on an external surface of said housing means for selectively supplying said regulated DC power thereto.

21. The energy-conserving power-supply system of claim 13, wherein said control means comprises means for interfacing with an associated device and microprocessor means for determining and controlling the activity of said switching means accordingly.

22. The energy-conserving power-supply system of claim 13, wherein said control means comprises a microprocessor and a manual-operable input means for manually requesting said microprocessor to control said switching means selectively to activate said second power supply for supplying said regulated DC power and to deactivate said second power supply for not supplying said regulated DC power.

23. The energy-conserving power-supply system of claim 13, wherein said first power supply has an output means for supplying said DC power to a clock means of a host device.

24. An energy-conserving method comprising the steps of:
(a) inputting AC power from an external AC-power source;
(b) generating keep-alive regulated-DC power from said AC power;
(c) selectively activating a switching means for distributing said AC power to at least one AC outlet means disposed on an external surface of a housing; and
(d) continuously supplying said keep-alive regulated-DC power to a control means for controlling an activity of said switching means.

25. The energy-conserving method of claim 24 further comprising the step of generating main regulated-DC power from said AC power.

26. The energy-conserving method of claim 25 further comprising the step of selectively distributing siad main regulated-DC power to a cooling means.

27. The energy-conserving method of claim 24 further comprising the step of selectively activating a second switching means for generating main regulated-DC power from said AC power.

28. The energy-conserving method of claim 24 further comprising the step of utilizing (i) an interfacing means to interface with an associated device7 and (ii) a microprocessor means to determined and control the activity of said switching means accordingly.

29. An energy-conserving method comprising the steps of:
(a) supplying keep-alive DC power from a power storage means;
(b) inputting AC power from an external AC power source;
(c) selectively activating a switching means for distributing said AC power; and
(d) continuously supplying said keep-alive DC power to a control means for controlling an activity of said switching means.

30. The energy-conserving method of claim 29, wherein said power storage means is selected from the group consisting of at least one non-rechargeable battery cell, at least one rechargeable battery cell, at least one dynamo, at least one solar cell, at least one fuel cell, and their combinations.

31. The energy-conserving method of claim 29 further comprising the step of generating regulated DC power from said AC power.

32. The energy-conserving method of claim 29 further comprising the step of supplying backup DC power from said power storage, when said external AC-power source suddenly ceases to supply said AC power.

33. The energy-conserving method of claim 29 further comprising the step of selectively activating a second switching means for generating regulated DC power from said AC power.

34. The energy-conserving method of claim 29 further comprising the step of distributing said AC power to at least one AC outlet means disposed on an external surface of a housing.

35. The energy-conserving method of claim 29 further comprising the step of utilizing (i) an interfacing means to interface with an associated device, and (ii) a microprocessor means to determine and control the activity of said switching means accordingly.

36. An energy-conserving method comprising the steps of:
(a) supplying keep-alive DC power from a power storage means;
(b) inputting AC power from an external AC power source;
(c) selectively activating a switching means for generating regulated DC power from said AC power; and
(d) continuously supplying said keep-alive DC power to a control means for controlling an activity of said switching means.

37. The energy-conserving method of claim 36, wherein said power storage means is selected from the group consisting of at least one non-rechargable battery cell, at least one rechargeable battery cell, at least one dynamo, at least one solar cell, at least one fuel cell, and their combinations.

38. The energy-conserving method of claim 36 further comprising the step of arranging said switching means in such a manner as to render said switching means actuatable for selectively generating said regulated DC power from said AC power.

39. The energy-conserving method of claim 36 further comprising the step of arranging said switching means in such a manner as to render said switching means actuatable for selectively distributing said regulated DC.

40. The energy-conserving method of claim 36 further comprising the step of supplying backup DC power from said power storage, when said external AC-power source suddenly ceases to supply said AC power.

41. The energy-conserving method of claim 36 further comprises the step of arranging said power storage means in such a manner chargeable when said switching means is activated for generating said regulated DC power.

42. The energy-conserving method of claim 36 further comprising the step of utilizing a microprocessor means for determining when said power storage means reaches a predetermined low level of DC power, so as to activate said switching means for generating said regulated DC power to recharge said power storage means.

43. The energy-conserving method of claim 36 further comprising the step of supplying said regulated DC power to at least one DC outlet means disposed on an external surface of a housing.

44. The energy-conserving method of claim 36 further comprising the step of utilizing (i) an interfacing means to interface with an associated device, and (ii) a microprocessor means to determine and a control the activity of said switching means accordingly.

45. The energy-conserving method of claim 36 further comprising the step of utilizing a manuel-operable input means for manually requesting said control means to control the activity of said switching means so as to selectively supply and not supply said regulated DC power.

46. The energy-conserving method of claim 36 further comprising the step of supplying said keep-alive DC power to a clock means of a host device.

\* \* \* \* \*